July 14, 1936.    W. E. DUERINGER    2,047,727

POWER AMPLIFYING AND POSITIONING APPARATUS

Filed Jan. 26, 1932

INVENTOR
Walter E. Dueringer.
BY
Raymond H. Junkins.
ATTORNEY

Patented July 14, 1936

2,047,727

UNITED STATES PATENT OFFICE 2,047,727

POWER AMPLIFYING AND POSITIONING APPARATUS

Walter E. Dueringer, Cleveland, Ohio, assignor to Bailey Meter Company, a corporation of Delaware Application January 26, 1932, Serial No. 589,009

5 Claims. (Cl. 177—351)

This invention relates in general to devices wherein the positioning of a member by a relatively weaker control force results in the positioning of another member locally or remotely by an amplified or relatively greater force to accomplish a desired purpose. Such devices have been known as torque or power amplifiers, and the movement of the second member may bear a functional relation to the movement of the first member or may be in relation to the amount, direction, and speed of departure of the first member from a given position; but in any event the second member is caused to move or to be positioned as the result of a change in position of the first member and with a force relatively greater than the force imparted to the first member.

The first member may be positioned or caused to depart from a given position in harmony with the magnitude of a variable, for example fluid pressure, differential pressure, temperature, ratio of fluid flow, or in fact any variable factor or relation whose force is desirably magnified to position a second member requiring a relatively greater force for such positioning. The second member so positioned may move an indicator locally or remotely, or may be used to move a damper or valve, or desirably regulable mechanism whose movement may or may not result in a change in value of the factor or relation which caused the initial movement of the first member.

My invention relates in particular to electrically actuated systems wherein the positioning of a first member in harmony with the magnitude of a variable or by hand operated means controls an electric circuit of an amplifying device which provides sufficient power to accomplish the work desired, and in amplified relation to the force which positions the first member. The invention further contemplates a repositioning arrangement wherein the electrically actuated amplifying means, when causing a change in position of the second member, simultaneously causes a positioning of the first member, or of parts related thereto, for further controlling the electric circuit and causing a stoppage of positioning of the electrically actuated means when sufficient change in position has been accomplished.

A primary object of my invention is to provide such apparatus in combination as above described.

A further object is to provide an arrangement wherein an indicator or second member remotely located from the first member may be controlled in amplified manner.

Another object is to incorporate in the arrangement a plugging of an electric motor when it is desired to stop rotation of the motor, whereby overtravel and hunting are minimized.

Further objects include novel arrangements of apparatus, and will become apparent in connection with the following description and disclosure of preferred embodiments of my invention illustrated in the drawing.

Figure 1:
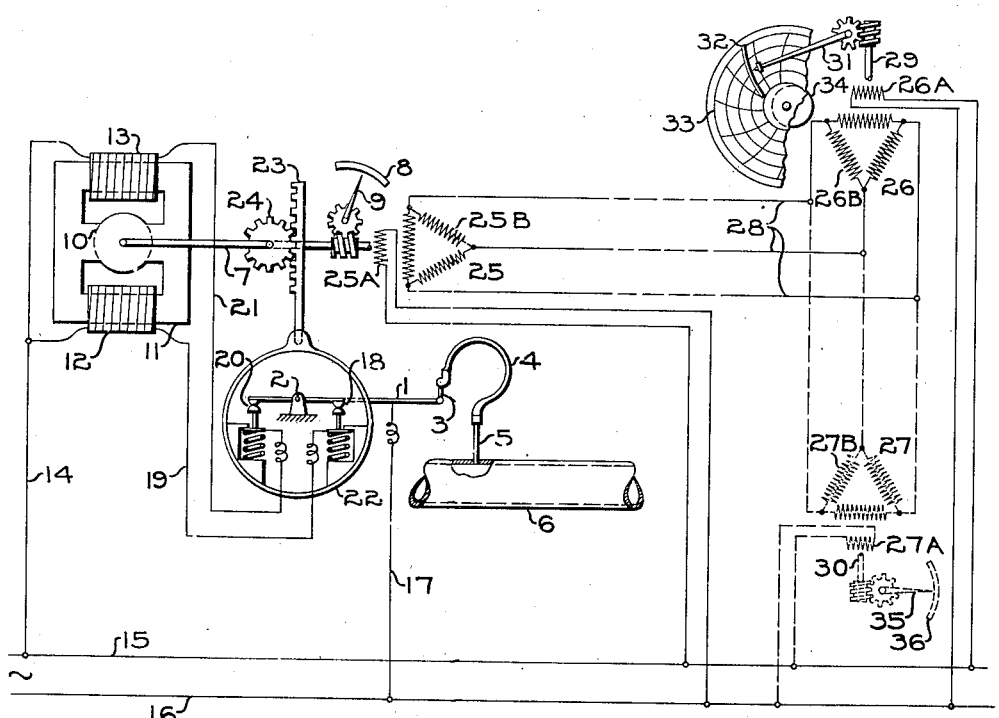
Fig. 1 illustrates a power amplifying positioning system for locally and/or remotely indicating the value of a variable.

In Fig. 1 I illustrate at 1 a first member taking the form of a beam pivoted intermediate its ends at 2, and pivotally connected at one end as at 3 to the free end of a Bourdon tube 4. Bourdon tube 4 is connected by means of a pressure pipe 5 with a conduit 6 wherein may be a fluid whose pressure or variation in pressure effective upon the Bourdon tube 4 causes a positioning of the beam 1 around its center 2. Thus the first member 1 may be positioned in accordance with the value of a variable and by a relatively weak force.

A second member 7 whose position is shown upon an index 8 by means of a pointer 9 cooperating therewith is desirably positioned in step with or in relation to the position of the first member 1.

In the present embodiment the second member 7 comprises an extension of the shaft of a rotor 10 of a self-starting synchronous motor 11 having two field windings 12 and 13. The field windings are oppositely arranged so that when both field windings are energized, the opposing equal torques created thereby balance the rotor 10, and when one or the other of the field windings is de-energized, the torque of the remaining field winding causes rotation of the rotor 10 in desired direction. Upon a subsequent energization of the de-energized field winding, an opposing torque is substantially instantaneously applied to the rotor, resulting in a plugging of the motor and substantially instantaneous stoppage of rotation, thereby preventing hunting and overtraveling.

If, for example, the field 12 is energized, the rotor 10 rotates in predetermined direction and with a rotating torque determined in part at least by the difference between the line E. M. F.

and the counter E. M. F. in the field 12. If now the field 13 is energized, the rotating torque of the field 12 is opposed by the sum of the line E. M. F. and the counter E. M. F. in the field 13, so that the stopping torque predominates the rotating torque by the sum of the two counter E. M. F.'s. Thus when the second field is energized, stoppage of rotation occurs substantially instantaneously and without overtravel.

The field windings 12 and 13 have a common conductor 14 joining an alternating-current power source 15. Control of energization of the field windings is in the positioning of the first member 1, whereby the positioning of the second member 7 through the agency of the motor 11 is accomplished in desirable amount and duration upon a positioning of the first member. The field winding 12 is connected to the other power source 16 through a conductor 19, a normally closed circuit contact 18 and a conductor 17. The field winding 13 is connected to the power source 16 through a conductor 21, a normally closed circuit contact 20 and the conductor 17.

One-half of each of the contacts 18 and 20 is carried by the first member 1, they being arranged on the member 1 at opposite sides of the pivot 2 and cooperating with spring-backed mating contacts carried by the contactor case 22 to which the pivot center 2 is fixed. The contactor case 22 as a whole is adapted (in the drawing) for vertical positioning through a rack 23 and gear 24, the latter carried by the shaft or second member 7 and positioned by the motor 11. The contactor case 22 is illustrated as comprising an annular, cylindrical housing carrying the spring-pressed contacts.

The arrangement is such that as shown, and assuming alternating current available at the power source 15, 16, the rotor 10 is normally stationary due to the balancing action of the applied equal opposing torques in the field windings 12 and 13 of the motor 11. Should, however, the pressure of the fluid within the conduit 6 change, for example, in an increasing direction, this pressure effective upon the Bourdon tube 4 causes the Bourdon tube to tend to straighten out, whereby the end 3 of the member 1 is moved upwardly, pivoting in a counterclockwise direction around its center 2. Such motion causes an open-circuiting of the contact 18 and retains the closed circuit condition of the contact 20. Opening the circuit of the contact 18 opens the circuit of the field winding 12, whereby the torque from the field winding 13 alone is effective upon the rotor 10, and the rotor is caused to move in a direction such that the rack 23 is moved upwardly, carrying with it the contactor case 22. When a certain amount of such vertical upward motion of the contactor case 22 is accomplished, the member 1 pivoting around its upwardly moving center 2 causes a closing of the contact 18 resulting in substantially instantaneous application of an opposing torque to the rotor 10 whereby rotation of the rotor 10 is substantially instantaneously stopped, thus preventing overtravel and hunting. Simultaneously, the positioning of the second member 7 in rotation is indicated by the pointer 9 upon the index 8 which in effect is an indication of the pressure within the conduit 6.

Correspondingly, a decrease in pressure within the conduit 6 would result in an open circuiting of the contact 20 and of the field winding 13 for causing rotation of the member 7 in the opposite direction, through which movement the contactor case 22 would be lowered until through the closing of contact 20 the opposing torque of the field winding 13 were applied to the rotor 10 for plugging and stopping motor 11.

I show in Fig. 1 a further possibility of remotely indicating and/or recording the position of the second member 7 as an indication of pressure within the conduit 2 or of the magnitude of a variable. I utilize the well known synchronous motor remote positioning system wherein (on the drawing) a transmitting generator 25 is located adjacent the member 7, while a plurality of receiving motors 26, 27 may be located remotely relative to the transmitting generator 25 and adjacent or remote to each other.

The generator and motors are similar in construction, having single-phase field windings 25A, 26A and 27A respectively on their rotors, and three-phase armature windings 25B, 26B and 27B on their stators. The field windings are energized from the alternating-current source 15, 16, while like points of the armature windings are interconnected by the conductors 28.

The operation of systems of this general character for the transmission of angular movement is well known in the art. Voltages are induced in the three-phase stator windings of the generator and motors by the single-phase field windings of the associated rotors. When the rotors of the generator and motors are in the same angular position with respect to their stators, the induced voltages in the armature windings are equal and opposite, and consequently no current is set up in the armature windings. If the rotor of the generator is turned and held in a new position, the voltage is no longer counterbalanced, whereby equalizing currents are caused to flow in the armature windings. The equalizing currents exert a torque on the rotor of each of the receiving motors, causing such rotors to take up a position each corresponding to the position of the generator rotor. Angular movement, therefore, imparted to the generator rotor 25A through the member 7 to which it is connected, is therefore reproduced by the receiving motors 26 and 27. When the shaft 7 is rotated, a proportional rotation occurs in angular movement or rotation of a shaft 29 of the receiving motor 26 and of a shaft 30 of the receiving motor 27, remotely located in the present embodiment from the transmitting generator 25 and from each other.

Positioned by the shaft 29 through suitable gearing is a pointer 31 cooperating with an index 32 and comprising a pen for recording upon a chart 33 which may be continuously rotated by a clock 34. Positioned by the shaft 30 I illustrate a pointer 35 cooperating with an index 36.

Figure 2:
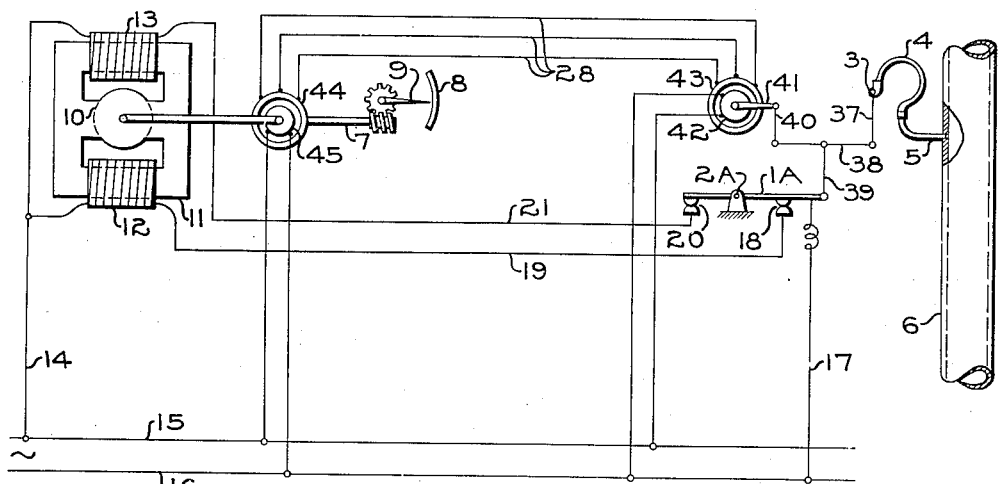
Fig. 2 illustrates an electrically actuated system embodying a further arrangement of the invention.

In Fig. 2 the motor 11 is shown as being located remotely from the conduit 6 as compared to the arrangement of Fig. 1. I have designated with the same numerals similar parts of Fig. 2 as in Fig. 1.

The conductors 19 and 21 from the motor 11 lead respectively to contacts 18 and 20 of a contactor located near the conduit 6 and having a fixed pivot 2A for a beam 1A connected by the conductor 17 to the power source 16. The beam 1A carries one-half of each of the contacts 18 and 20 respectively, and normally is in closed circuit relation of such contacts.

The Bourdon tube 4 connected by the pipe 5 to the conduit 6 and sensitive to fluid pressure therein is connected as at 3 to a vertical link 37 which is pivotally connected at its lower end to one end of a freely floating bar 38. Intermediate the ends of the bar 38 is suspended a vertical link 39 pivotally connected thereto, joining at its lower end to one end of the contactor beam 1A for positioning the same around its pivot 2A. The other end of the floating beam 38 is pivotally connected to a vertical link 40 pivotally joined at its other end to an arm 41 from the rotor 42 of a receiving motor, the stator of which is designated at 43. This motor is similar in type and function to those designated in Fig. 1 at 26 and 27, and its three-phase stator winding 43 is connected by the conductors 28 to the three-phase stator 44 of a transmitting generator having a field wound rotor 45 fastened to and positioned by the shaft member 7.

The arrangement shown in Fig. 2 is such that upon an increase in pressure within the conduit 6, the Bourdon tube 4 tends to straighten out, moving the point 3 in a clockwise rotation, thereby raising upwardly the link 37 and the connected end of the floating beam 38. Furthermore, the link 39 is moved upwardly as is the connected end of the contactor bar 1A pivoting around its center 2A and causing an open-circuiting of the contact 18. Such open circuiting open circuits the field winding 12 of the motor 11, whereby the torque of the field 13 is alone effective to cause rotation of the rotor 10 in desired direction, which movement is indicated by the pointer 9 on the index 8, and simultaneously a movement of the rotor 45 of the transmitting generator is accomplished in desired direction and amount.

Such movement of the rotor 45 is duplicated by a movement of the rotor 42 remotely therefrom, which causes a rotation of the rotor arm 41 in clockwise direction, lowering the link 40 and the connected end of the beam 38 until the link 39 and the connected end of the pivoted beam 1A is lowered in amount sufficient to cause a close-circuiting of the contact 18. Such closing of circuit of the contact 18 energizes the field 12 and substantially instantaneously applies an opposing torque to the rotor 10, whereby the rotor 10 is substantially instantaneously stopped in its rotation.

I have illustrated and described preferred embodiments of my invention, but in general I contemplate an arrangement wherein an electric circuit is controlled upon a change in position of a member whose change in position is responsive to variation in the magnitude of a variable, and where such electric circuit controls electrically actuated means for providing an amplified power to position a member in accordance with the magnitude of the variable. Furthermore, I cause a movement of the second member, which has been moved with amplified power, to reposition the circuit controlling means and further control the electric circuit for stopping movement of the second member when sufficient movement or positioning has been accomplished.

Additionally, I provide that the electrically actuated means for providing the amplified power comprises an opposedly wound field motor whose rotor is normally stationary due to the balancing action of equal opposing torques thereon and whose rotor is allowed to move in one direction or the other through the releasing therefrom of one of the opposing torques. Further, that upon a reapplication of the opposing torque, substantially instantaneous stoppage of movement of the rotor is accomplished for minimizing hunting and overtravel.

Through the arrangement I have provided, I am able to accomplish useful work of materially greater magnitude than the power available through variation of the variable, and I may use such work to position remotely or locally indicators, recorders or to control or otherwise utilize to best advantage such amplified power.

Having now described a preferred embodiment of my invention, I desire to be limited thereto only as to the claims in view of prior art.

What I claim as new and desire to secure by Letters Patent of the United States, is:

1. A motion transmitting system comprising in combination, an electric motor, an electric circuit including said motor, a contactor case, a pair of contacts within said contactor case and connected in said electric circuit, a pivoted first member controlling said contacts and having a neutral position for normally rendering said motor inoperative, a center within said contactor case about which said first member deflects, means for angularly displacing said first member about said center from its neutral position to effect rotation of the motor in one direction, a second member actuated by the motor, and means connecting the second member and the contactor case for moving the said case and the contacts and center carried thereby substantially radially of said center to restore the first member to its neutral position and to render the motor inoperative.

2. A motion transmitting system comprising in combination a rotary electric motor, an electric circuit including said motor, a contactor case, a pair of spaced contacts within said contactor case and connected in said electric circuit, a pivoted member controlling said contacts and having a neutral position for normally rendering said motor inoperative, a center within said contactor case positioned between the spaced contacts therein and about which said first member deflects, means for angularly displacing said first member about said center from its neutral position to actuate one of the contacts at one side of the center to effect rotation of the motor in one direction, a shaft actuated by said rotary electric motor, a gear on said shaft, and a rack engaged by said gear and connected to said contactor case for moving said case and the contacts and center carried thereby substantially radially of said center to restore the first member to its neutral position and to render the motor inoperative.

3. A control instrument comprising a pair of control members having engageable parts, means for adjusting one of said members relative to the other about an axis for moving said parts out of engagement, means for moving one of said members relative to the other in a direction radial to said axis to establish engagement between said parts, and means for selectively effecting control actions dependent upon engagement or non-engagement of said parts.

4. A control instrument comprising a pair of control elements having plural pairs of engageable parts, means for adjusting one of said members relative to the other about an axis in either direction for selectively breaking engagement between one or the other of said pairs of engageable parts, means for moving one of said members relative to the other in a direction radial to said axis to respectively reestablish engagement between said pairs of engageable parts and means for selectively effecting control actions dependent upon the simultaneous engagement or non-engagement of said pairs of engageable parts.

5. A control instrument comprising a pair of control members having engageable parts, means for adjusting one of said members relative to the other about an axis for moving said parts out of engagement, means including an electric motor for moving one of said members relative to the other in a direction radial to said axis to reestablish engagement between said engageable parts, a source of current, and means for selectively energizing said motor in accordance with the condition of engagement or non-engagement of said engageable parts for effecting a control action.

WALTER E. DUERINGER.